US012172885B2

(12) United States Patent
Babyak

(10) Patent No.: US 12,172,885 B2
(45) **Date of Patent: *Dec. 24, 2024**

(54) HORSE STOPPING METHOD AND APPARATUS

(71) Applicant: Sheryl D. Babyak, Phoenix, AZ (US)

(72) Inventor: Sheryl D. Babyak, Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/419,053

(22) Filed: Jan. 22, 2024

(65) Prior Publication Data

US 2024/0308840 A1 Sep. 19, 2024

Related U.S. Application Data

(63) Continuation of application No. 17/832,633, filed on Jun. 4, 2022, now Pat. No. 11,897,755.

(51) Int. Cl.
*B68B 1/04* (2006.01)

(52) U.S. Cl.
CPC .................................... *B68B 1/04* (2013.01)

(58) Field of Classification Search
CPC .... B68B 1/04; B68B 1/00; B68B 5/00; A62B 35/04
USPC ....................................................... 54/6.1, 36
See application file for complete search history.

(56) References Cited

U.S. PATENT DOCUMENTS

| | | | | |
|---|---|---|---|---|
| 6,299,040 | B1 * | 10/2001 | Matias | A62B 35/0075 224/254 |
| 11,897,755 | B2 * | 2/2024 | Babyak | B68B 1/04 |
| 2003/0121237 | A1 * | 7/2003 | Earnhart | B68C 1/147 54/23 |
| 2015/0307342 | A1 * | 10/2015 | Pierce | B68B 1/00 54/71 |
| 2017/0275150 | A1 * | 9/2017 | Taylor | B68B 5/00 |

* cited by examiner

*Primary Examiner* — Brady W Frazier
*Assistant Examiner* — Zoe Tam Tran
(74) *Attorney, Agent, or Firm* — Malcolm E. Whittaker; Whittaker Law Firm

(57) ABSTRACT

A method of mitigating the risk of a horse fleeing and becoming lost, comprising: fastening a horse-stopping apparatus to a horse, wherein the horse stopping apparatus for slowing and stopping the horse after a rider has been involuntarily separated, comprises: a leading segment configured to be detachably fastened to the horse's head piece; a trample segment fastened to the leading segment; and, a trailing segment detachably fastened to the trample segment and also configured to be connected to the rider; whereby if the rider is involuntarily separated from the horse, the trailing segment will extend the trample segment and the forward motion of the horse will carry the trample segment under the hooves of the horse; whereby the hooves of the horse will trample the trample segment thereby pulling the horse's head downwardly and thereby slowing and stopping the horse.

20 Claims, 9 Drawing Sheets

HORSE STOPPING METHOD AND APPARATUS

CROSS-REFERENCE TO RELATED APPLICATIONS

The present application is a continuation of U.S. patent application Ser. No. 17/832,633, currently pending, allowed, with the issue fee paid.

STATEMENT REGARDING FEDERALLY SPONSORED RESEARCH

Not Applicable.

TECHNICAL FIELD OF THE INVENTION

A horse-stopping method and apparatus for slowing and stopping a horse after a rider has been involuntarily separated from her horse.

BACKGROUND OF THE INVENTION

Humans have been riding horses for many thousands of years. According to the National Science Foundation, humans may have domesticated horses approximately 5,500 years ago. The Botai, a group situated in the vast, semi-arid plains east of the Ural mountains in present day Kazakhstan, were the first humans to domesticate and ride horses. The Botai are also believed to have milked horses and hunted them for food.

Ancient Egyptians used horses to pull war chariots; the driver appears to have controlled the horse using an early bridle. Since domestication, horses have been used in warfare, for pulling loads, herding livestock and as a means of transportation. A horse can transport humans by carrying a rider on its back or by pulling a wheeled vehicle holding people and/or cargo. Because the vehicle weighs more than a typical human, riding the horse allows the horse to travel faster than if it were pulling a carriage with a human passenger.

Modern day humans use horses in many ways for a variety of tasks: for recreation, which includes long-distance riding and trail riding; herding livestock; arena sports, such as polo and gymkhana; rodeo; racing; crowd control by law enforcement; pulling carriages; and hauling loads. Horses in arenas and track settings are usually contained by fencing or walls. Other activities may occur in remote locations where fencing may be miles apart or absent. A horse startled in a confined location will only be able to run inside the walled or fenced area, but where there are no such constraints, a horse that is startled may run for long distances and become irretrievably separated from its rider.

Riding a horse creates a risk that the rider may fall or be thrown. Often, when this occurs, the horse may become frightened and may flee, thereby potentially becoming disoriented and lost. The horse, or its remains, may never be located or may be found many miles from the spot where the rider fell. In the event that inspired this invention, the remains of a horse were found nearly a year later, eight miles from where the rider was thrown. This event occurred during February 2021, in Wickenburg, AZ on a cattle ranch. Horse and rider were parted in the excitement at the start of a long-distance endurance race.

Earlier inventions have been geared toward keeping the rider "more connected" to the horse rather than stopping the horse after the rider has been involuntarily dismounted or otherwise involuntarily separated from the horse. An example of this type of solution is U.S. Pat. No. 9,718,667, issued to David Elliot, on Aug. 1, 2017, for "A System for Use in Horseback Riding."

Other devices attempt to address the problem by constraining unwanted or uncontrolled movement of the horse. An example of such a device is a hobble. A hobble is a device that is secured to and binds the horse's legs. It restricts movement by limiting the distance a horse can separate its legs. Hobbles, as illustrated in FIG. 1, can be both useful and safe. For example, a horse can be hobbled and need not be tied to a tree or other fixed point when the rider dismounts or even sleeps for the night during a long ride. FIG. 1 illustrates hobbles in use on the horse's front hooves. Hobbles should not be used when riding the horse.

Horses are ridden in groups or alone in a variety of environments and, in each situation, the rider may be parted from the horse. The present apparatus is especially useful when the horse is being ridden in an area where, if startled, it may bolt and be lost or injured. The horse-stopping apparatus is useful in all situations where the rider is involuntarily separated from the horse, whether it is from the horse's back or when leading the animal.

FIG. 2A illustrates a horse H wearing a conventional saddle W and head piece Y. Head piece Y may include a bridle and/or a halter. A halter is a devise to which a lead rope may be attached. A bridle maybe placed over the halter, or the halter may be removed prior to placement of the bridle. The head piece Y may use a bit, may be a bitless bridle or a hackamore. FIG. 2B illustrates the head piece Y may further comprise a bit T, and a bit ring R. With a bitless head piece, the bit T and bit ring R are not present. Both saddle W and head piece Y are conventional and typically used with horses H. The saddle depicted here is a typical English saddle. Other types of saddles include Western, Endurance, and treeless. Horses may also be ridden bareback or with a bareback pad.

FIG. 2A illustrates that it is known that a rider controls the horse H using the reins L. The reins may attach to a bit T which is placed into the horse H's mouth, as illustrated in FIGS. 2A and 2B, and the rider uses reins L to control the horse H. The bit rests on the sensitive interdental space between the horse's teeth known as the "bars," which is a normal part of the horse's anatomy. A bitless bridle has a special type of noseband instead of a bit that works on pressure points of the face, nose, and chin. With proper use, these devices do not harm or injure horse H.

Typically, the head piece Y and reins L all work together to communicate with the horse H. A bit T works by applying pressure inside the horse's mouth. Depending on the bit T used, it may apply pressure on the horse's tongue, the roof and the corners of the mouth. The primary use for the head piece Y is to hold the bit T in place in horse H's mouth, although it also may create additional pressure on a horse's cheeks, chin, nose, or poll. The noseband on a bitless head piece works under a similar principle as a bitted head piece.

The way a head piece Y works takes advantage of a horse's natural inclination to move away from the discomfort of pressure. As the rider pulls on the reins, the horse moves in the direction the rider wants it to. By using strategic pulls, the rider signals what is desired of the horse. Any device used to control a horse should only provide pressure and not pain. Again, with proper use these devices do not harm or injure horse H.

Horses are trained to respond to a rider. Generally, applying pressure to one side of the reins pulls the horse's head in that direction. For example, when a rider pulls the reins to the left, the horse receives the signal to move toward the left. Applying a consistent pressure on both sides of the reins generally signals to a horse to slow down or to stop, depending on the level of pressure. This communication may also be used in conjunction with signals from the rider's legs and voice commands. Pulling the horse's head downward or to the side causes the horse to slow and stop because it focuses the horse's field of vision on the ground or to the side and not on the path forward.

A rider who has been thrown or otherwise involuntarily disengaged from the horse H will not be able to signal the horse with the head piece or legs. The horse-stopping apparatus will be useful on any occasion where the horse and rider become separated.

The present invention seeks to mitigate the risk of the horse H fleeing and becoming lost.

SUMMARY OF THE INVENTION

A method of mitigating the risk of a horse fleeing and becoming lost, comprising: fastening a horse-stopping apparatus to a horse, wherein the horse stopping apparatus for slowing and stopping the horse after a rider has been involuntarily separated, comprises: a leading segment detachably fastened to the horse's head piece; a trample segment fastened to the leading segment; and, a trailing segment detachably fastened to the trample segment and also connected to the rider; whereby if the rider is involuntarily separated from the horse, the trailing segment will extend the trample segment and the forward motion of the horse will carry the trample segment under the hooves of the horse; whereby the hooves of the horse will trample the trample segment thereby pulling the horse's head downwardly and thereby slowing and stopping the horse.

These and other embodiments will be more fully appreciated from the description below.

DESCRIPTION OF THE PREFERRED EMBODIMENTS

Corresponding reference numbers indicate corresponding parts throughout the several views of the drawings and specification.

Figure 1:
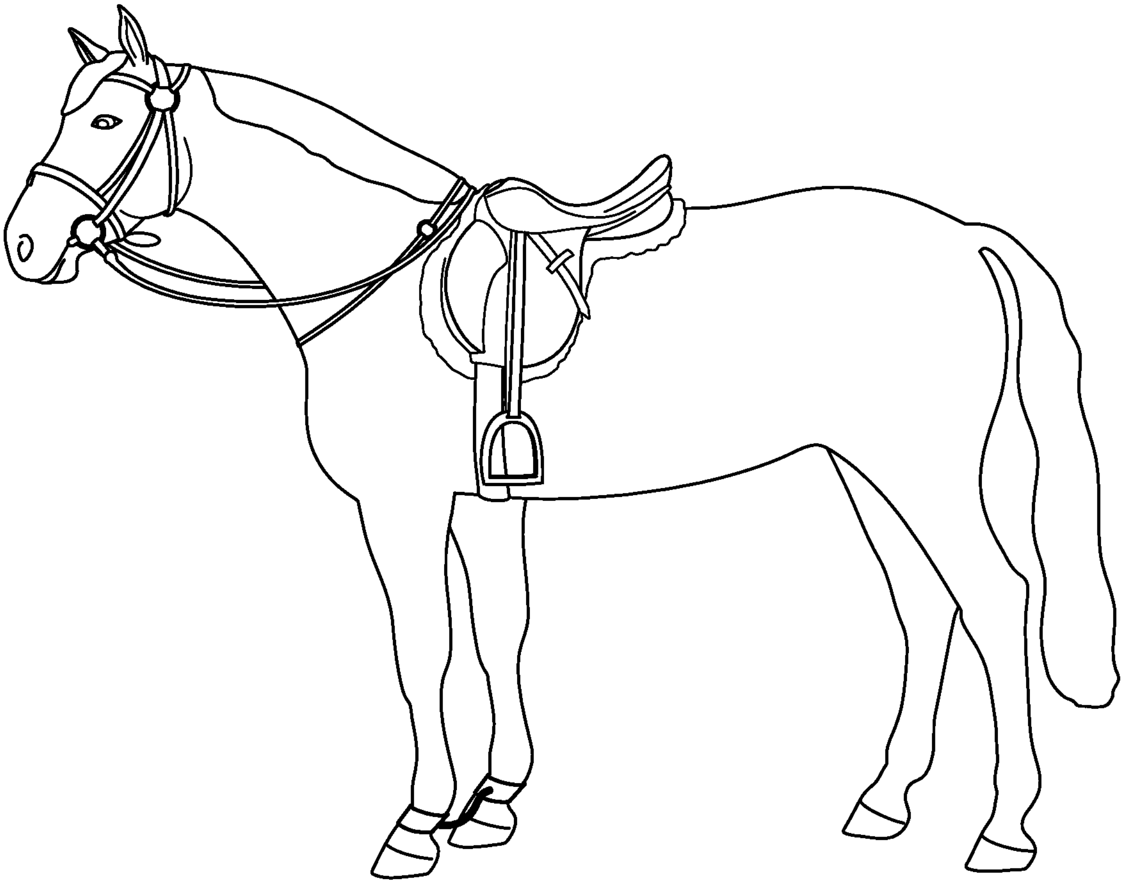
FIG. 1 PRIOR ART
FIG. 1 illustrates a horse tacked up, i.e., wearing a saddle, bridle, halter and associated tack and hobbles on the horse's front hooves. The horse, saddle, bridle, and hobbles may generally be thought of as prior art. Typically, hobbles are not used during riding.
Figure 2A:
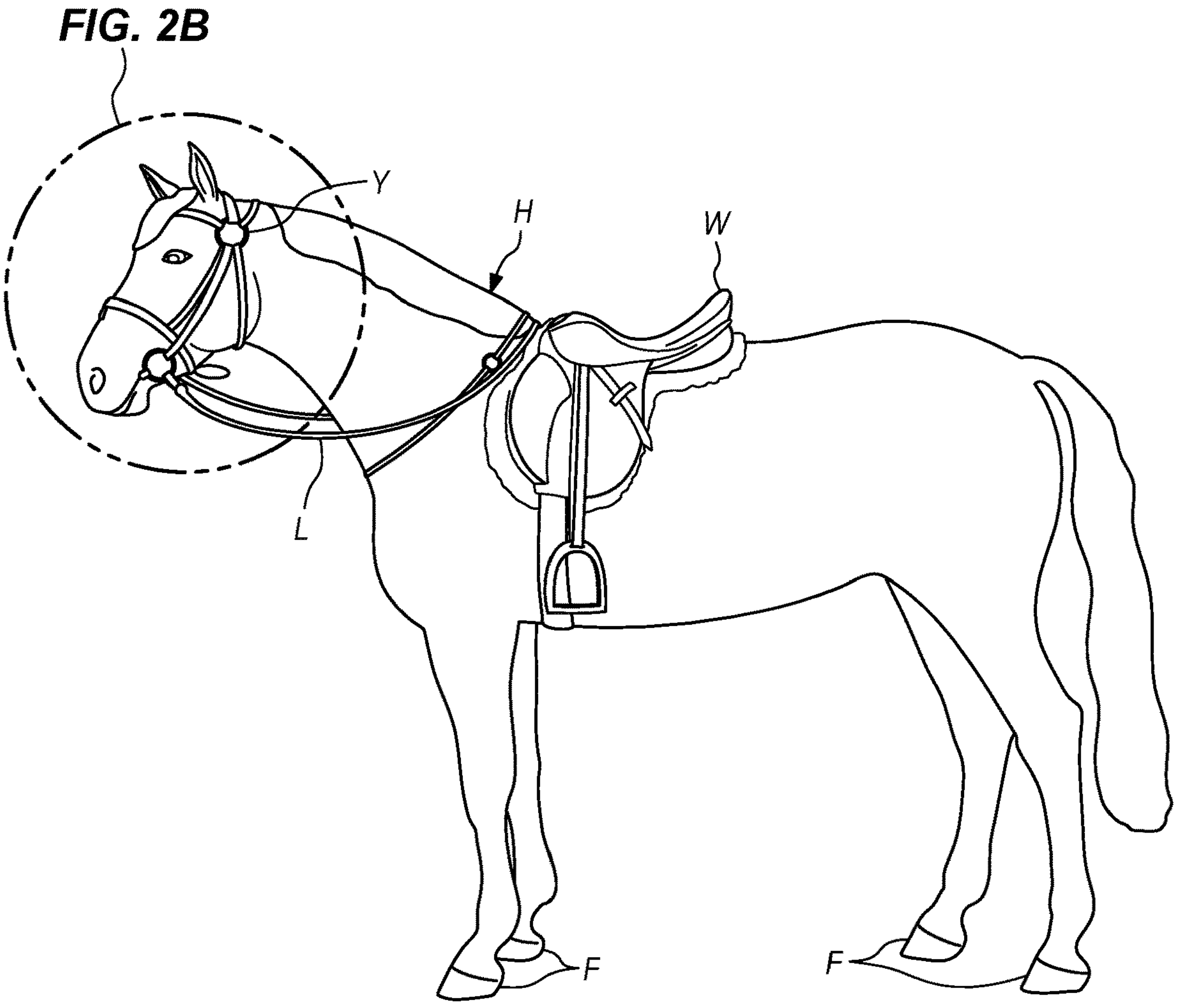
FIG. 2A PRIOR ART
FIG. 2A illustrates a horse tacked up, i.e., wearing a saddle, bridle, halter and associated tack.
Figure 2B:
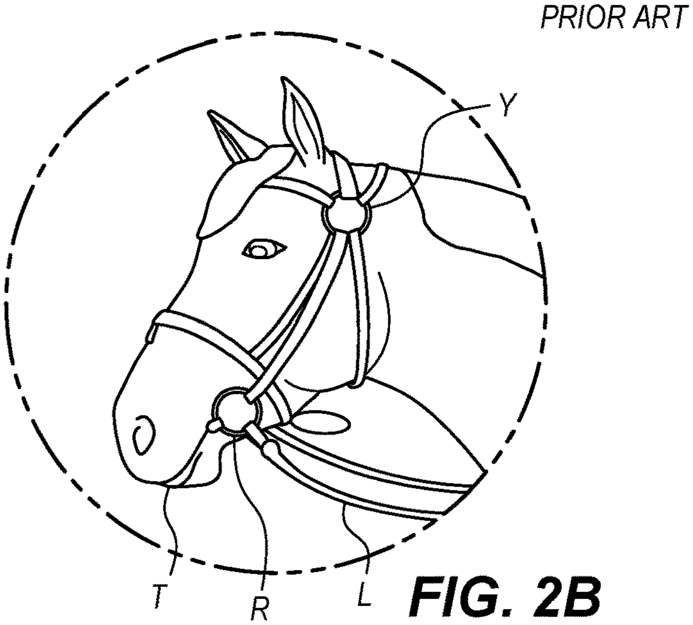
FIG. 2B PRIOR ART
FIG. 2B illustrates the horse's head wearing a bitted head piece and halter.
Figure 3A:
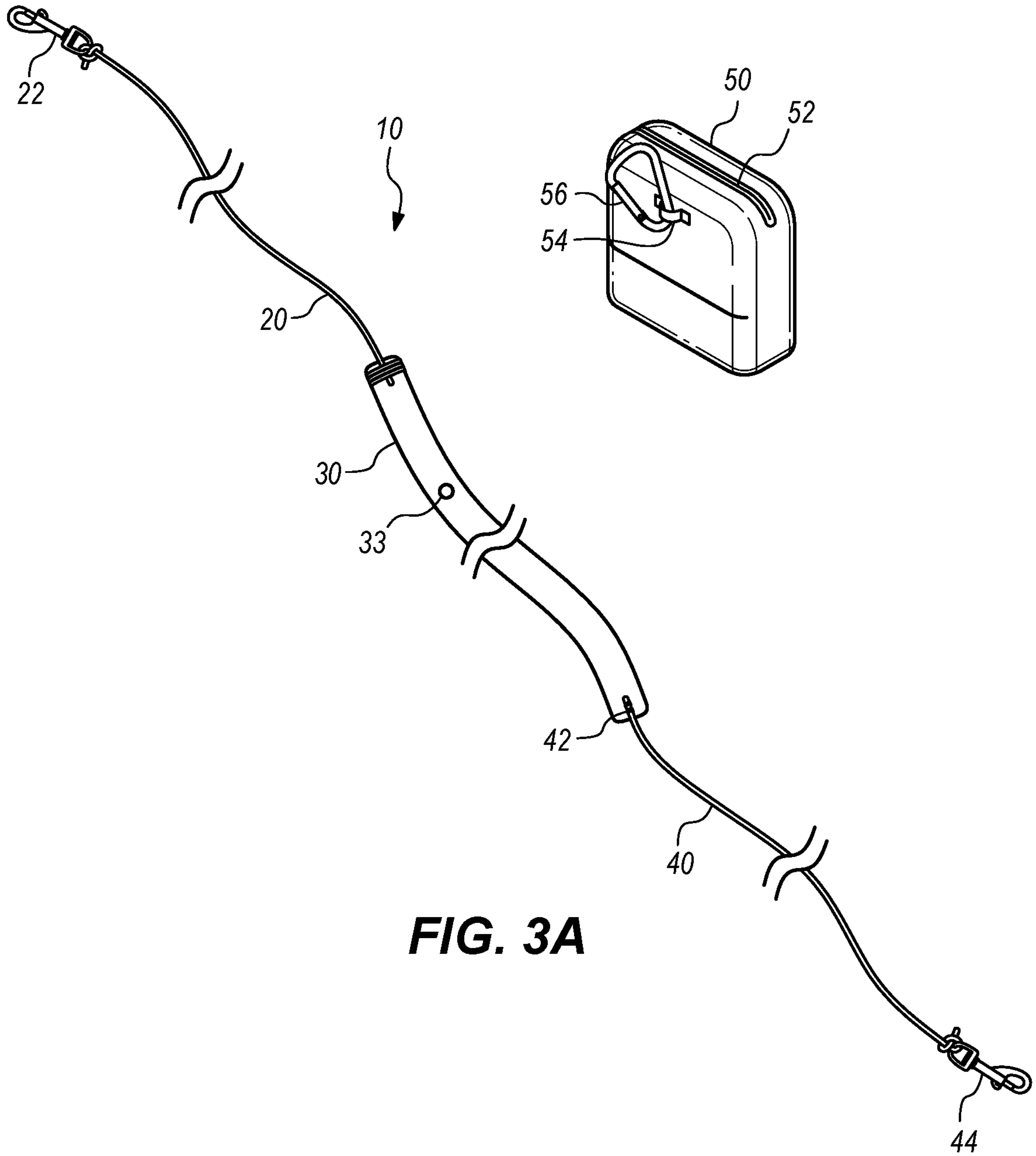
FIG. 3A illustrates a horse-stopping apparatus.
Figure 3B:
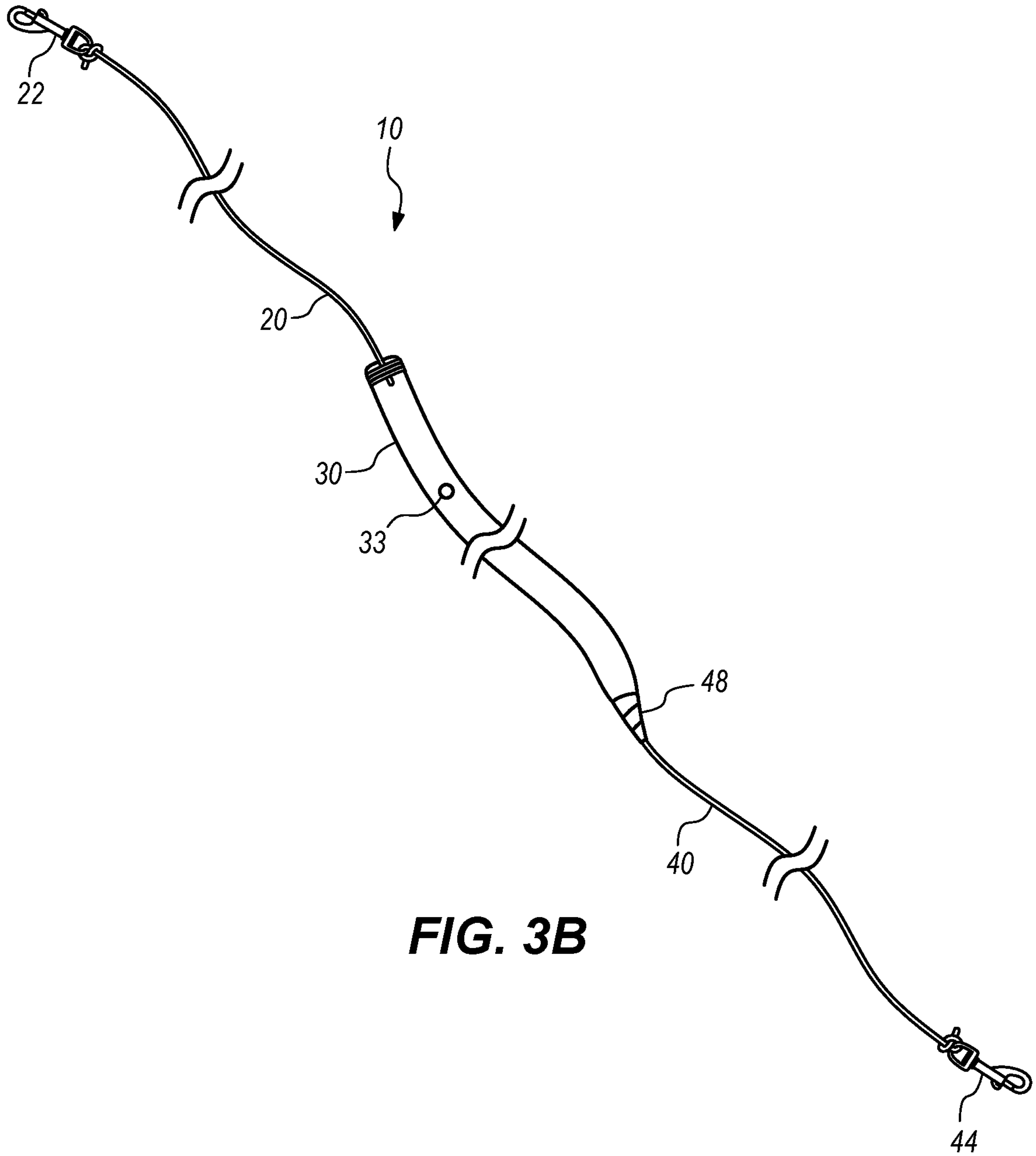
FIG. 3B illustrates an alternative embodiment of the horse-stopping apparatus.

FIGS. 3A and 3B illustrates a horse-stopping apparatus 10 before it is fastened to a horse H. The horse-stopping apparatus 10 further comprises a leading segment 20, a trample segment 30, a trailing segment 40, and a container 50. The leading segment 20 is fastened to the trample segment 30. Trample segment 30 is fastened to trailing segment 40. Preferably, container 50 contains trample segment 30.

Figure 4:
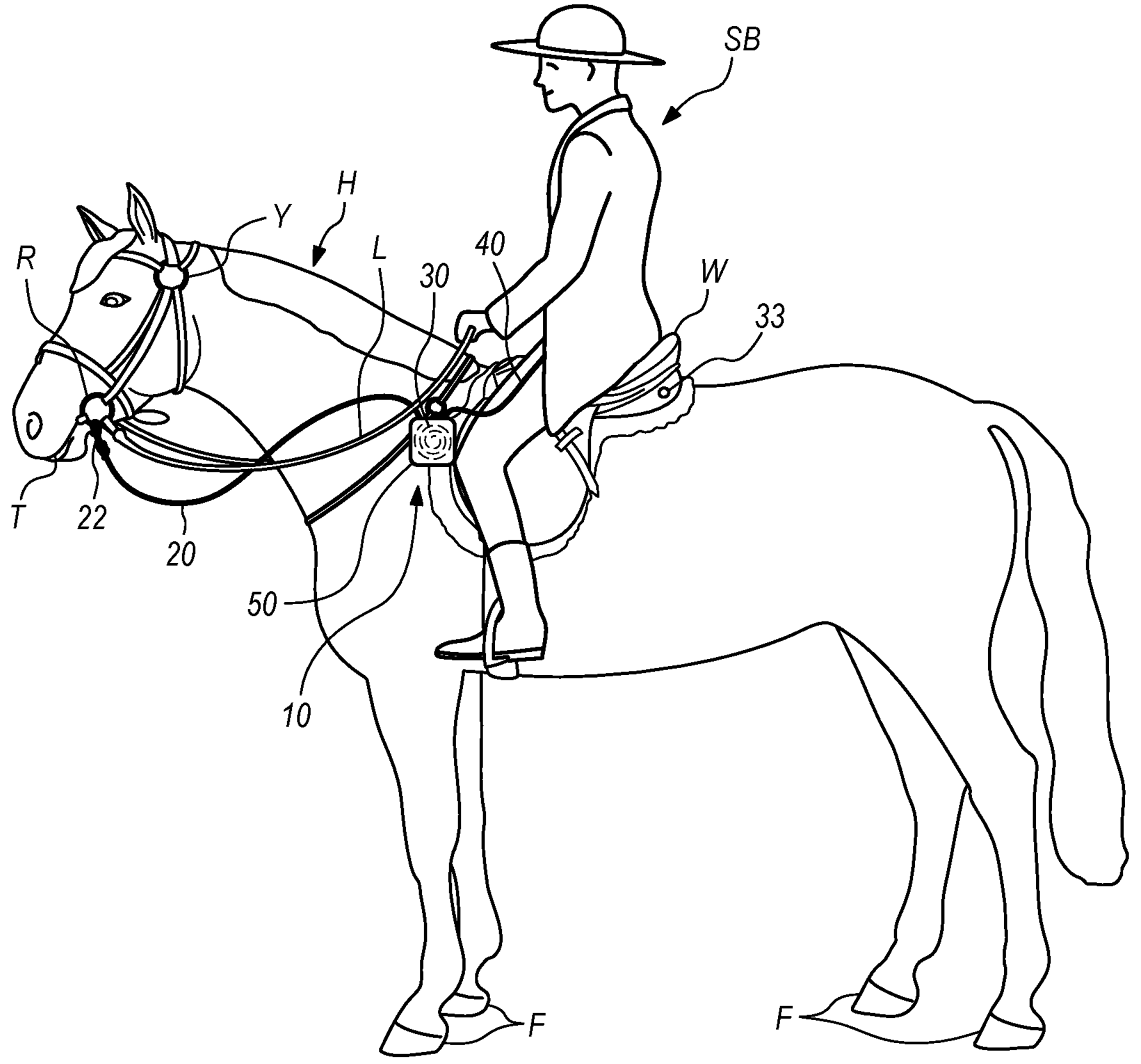
FIG. 4 illustrates an environmental view of the horse-stopping apparatus in use with the horse wearing a bitted head piece when the horse is stationary.

FIGS. 3A and 4 illustrates horse-stopping apparatus 10 in use with the horse H. Horse-stopping apparatus 10 is detachably fastened to a head piece Y. Alternatively, one end of the leading segment 20 is attached to the bit T. In many cases, bit T has bit rings R on either side. It has been found that fastening leading segment 20 to bit ring R is preferred. In the preferred embodiment, a snap hook 22 detachably fastens leading segment 20 to bit ring R. In the preferred embodiment, leading segment 20 is ⅜-inch (9.53 millimeters) nylon cord. While it may be preferred to attach leading segment 20 to bit ring R, it is also believed that horse-stopping apparatus 10 will work appropriately if leading segment 20 is fastened to head piece Y, hackamore, a halter, or other similar tack worn on the horse H's head.

FIGS. 3A and 4 illustrate leading segment 20 is attached to trample segment 30. Preferably, trample segment 30 is coilingly contained inside container 50. Preferably, trample segment 30 is a wide flat segment of woven nylon or similar material sufficiently sturdy to withstand the hoof F impacts from horse H. The preferred embodiment of the trample section is two-inch (5.08 centimeters) wide flat nylon with a breaking strength of 4,250 lbs. (1927 kilograms), a recommended load of 1416 lbs. (642 kilograms), and a thickness of 0.070 to 0.075 inches (1.778 millimeters to 1.905 millimeters) and an approximate melting point of 380-425 degrees Fahrenheit (193-218 degrees Centigrade). Trailing segment 40 is detachably fastened to trample segment 30 and also detachably fastened to the rider SB. In the preferred embodiment, trailing segment 40 is attached to rider SB by a snap hook 44, or the like. Alternatively, and less preferably, trailing segment 40 could be tied to rider SB.

As illustrated in FIGS. 3A and 4, trample segment 30 and trailing segment 40 are detachably connected and are designed to separate when the rider SB is thrown, or involuntarily disengaged from horse H. In the preferred embodiment, trample segment 30 and trailing segment 40 are detachably connected using a cable tie 42. Cable ties 42 are commonly referred to as zip ties or the like. It is believed that cable ties were the subject of a now expired U.S. Pat. No. 3,022,557, titled "Cable Bundling and Supporting Strap," issued on Feb. 27, 1962, in which the inventor was Maurus C. Logan. Preferably, cable ties 42 are formed from nylon or another suitable material. Preferably, cable ties 42 are four or less inches in length and have a yield strength of about 18 pounds (8.16 kilograms). Cable ties 42 are selected as the "weak point" or "weak link" of horse-stopping apparatus 10 and are designed to separate in the event that rider SB is involuntarily dismounted or otherwise involuntarily disengaged.

Figure 5A:
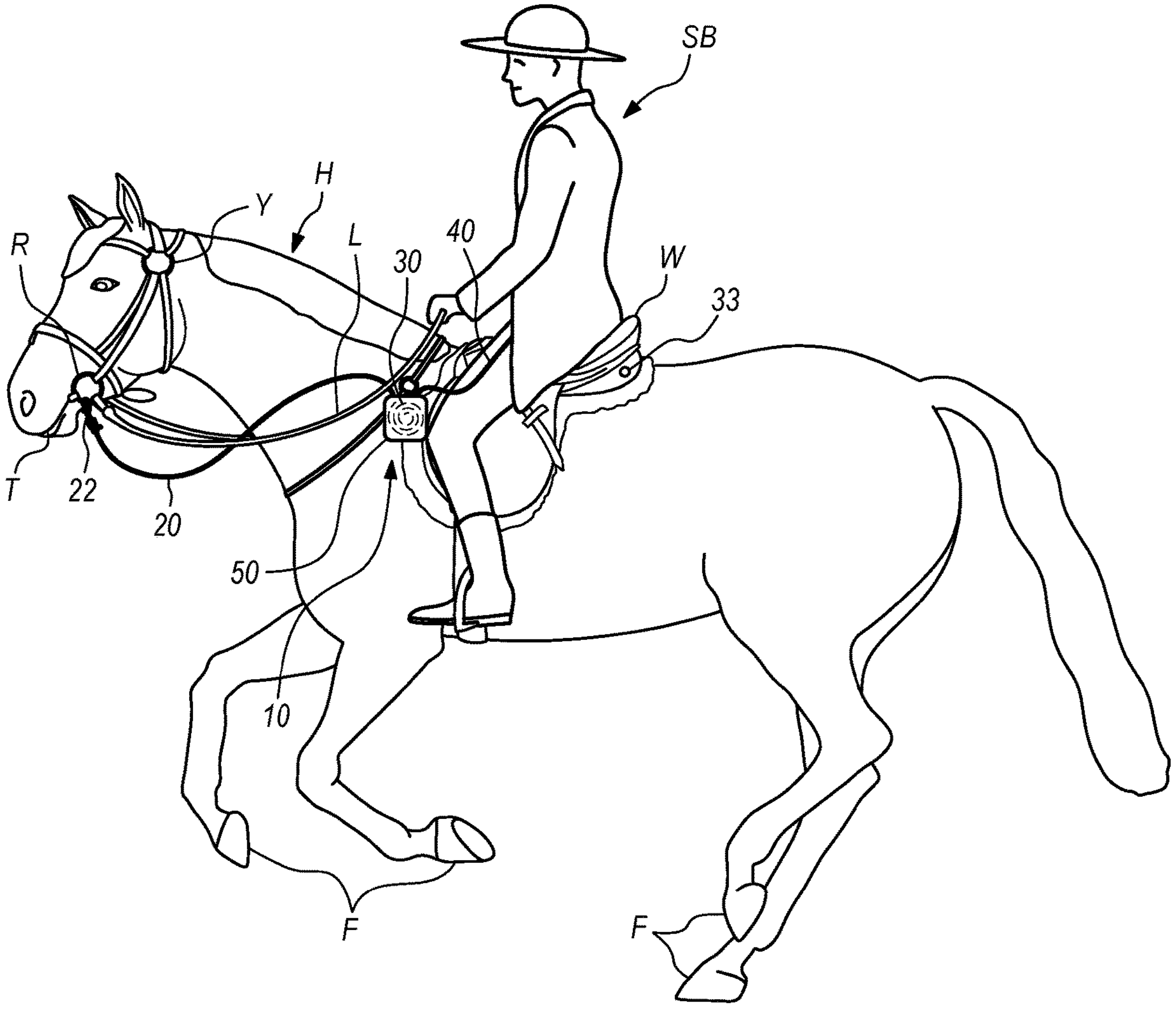
FIG. 5A illustrates an environmental view of the horse-stopping apparatus in use with the horse wearing a bitted head piece when the horse is in motion.
Figure 5B:
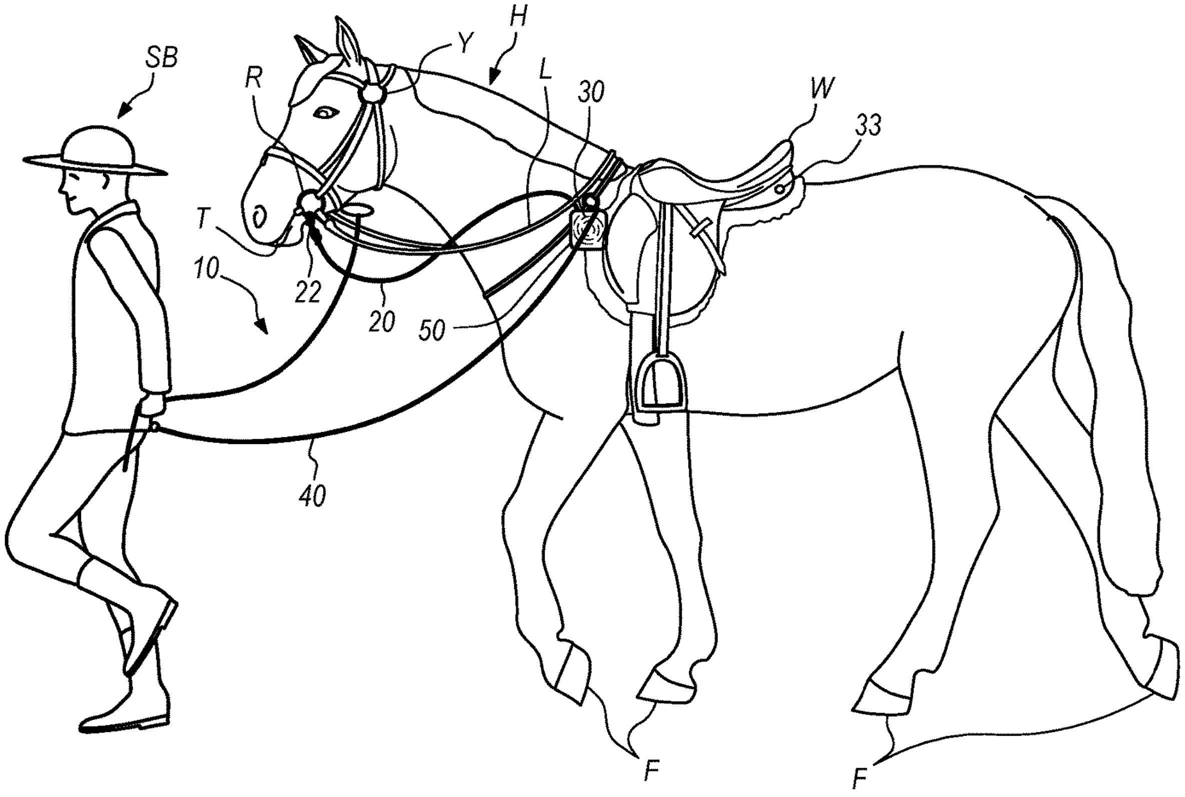
FIG. 5B illustrates an environmental view of the horse-stopping apparatus in use with the horse being led by the dismounted rider.

Preferably, as illustrated in FIG. 5B, trailing segment 40 is formed of an elastic material that will stretch without breaking when rider SB voluntarily dismounts horse H and leads horse H around an obstacle or while leading horse H through a gate, while opening and closing the gate, and re-mounting horse H. In the preferred embodiment, it has been found that Mandela Craft flat elastic is highly suitable as trailing segment 40. However, alternative embodiments such as bungee cord, cord elastic, knitted elastic, and braided elastic are also suitable. It is highly preferable that trailing segment 40 is stretchable.

As discussed above, trample segment 30 and trailing segment 40 are detachably connected by cable ties 42.

FIG. 3B illustrates an alternative embodiment of horse-stopping apparatus 10 in which cable ties 42 are covered, shielded or wrapped by shield 48. It has been found in practice that shield 48 may preferably be a series of loops of vinyl tape. Cable ties 42 may also be referred to as connector 42. Preferably, shield 48 shapes the trailing segment 40 and trample segment 30 such that they will be shaped more conically to help them come out of the container 50 and mitigate snagging on container 50 as it comes out.

Alternatively, connector 42 could detachably connect trample segment 30 and trailing segment 40 by sewing, stitching, or gluing or the like.

It is worth noting that horses H are of different sizes. As such, the lengths of leading segment 20, the trample segment 30, and the trailing segment 40 may be longer or shorter depending on the size of horse H. While riders SB are also of different sizes it has been found that preferably, trailing segment 40 is attached to rider SB at or near rider SB's waist.

FIG. 4 illustrates an environmental view of the horse-stopping apparatus 10 in use with the horse H wearing a bitted head piece Y when the horse His stationary. For purposed of clarity, bit T is also illustrated in FIG. 4.

FIGS. 3A and 4 illustrates that container 50 may be detachably connected to horse H's tack by a carabiner 56. In the preferred embodiment, container 50 further comprises attachment loop 54, and opening 52. In the preferred embodiment, opening 52 is located upwardly. However, it has been found that if opening 52 has a magnetic closure, that container 50 may be positioned upwardly, downwardly or with opening 52 facing towards horse H's head or tail. Phrased differently, opening 52 will retain some portion of horse stopping apparatus 10 until it is deployed after rider SB is involuntarily separated from horse H.

FIG. 5A illustrates an environmental view of the horse-stopping apparatus 10 in use with the horse H wearing a head piece Y with a bit T when the horse is in motion. Use of a head piece with a bit is more commonly referred to as a "bitted bridle."

FIG. 5B illustrates an additional advantage of horse-stopping apparatus 10. Namely, the connection of rider SB with horse H. When the rider SB comes to a gate or other obstacle that requires her to intentionally dismount horse H, she is able to lead horse H using horse-stopping apparatus 10 and remains connected to horse H. After dismounted rider SB and horse H have navigated the obstacle, rider SB can remount horse H and continue riding. If horse H should be startled or spooked while the rider SB is dismounted, and were to bolt, the horse-stopping apparatus 10 would deploy and horse H would be stopped within a short distance.

Figure 6:
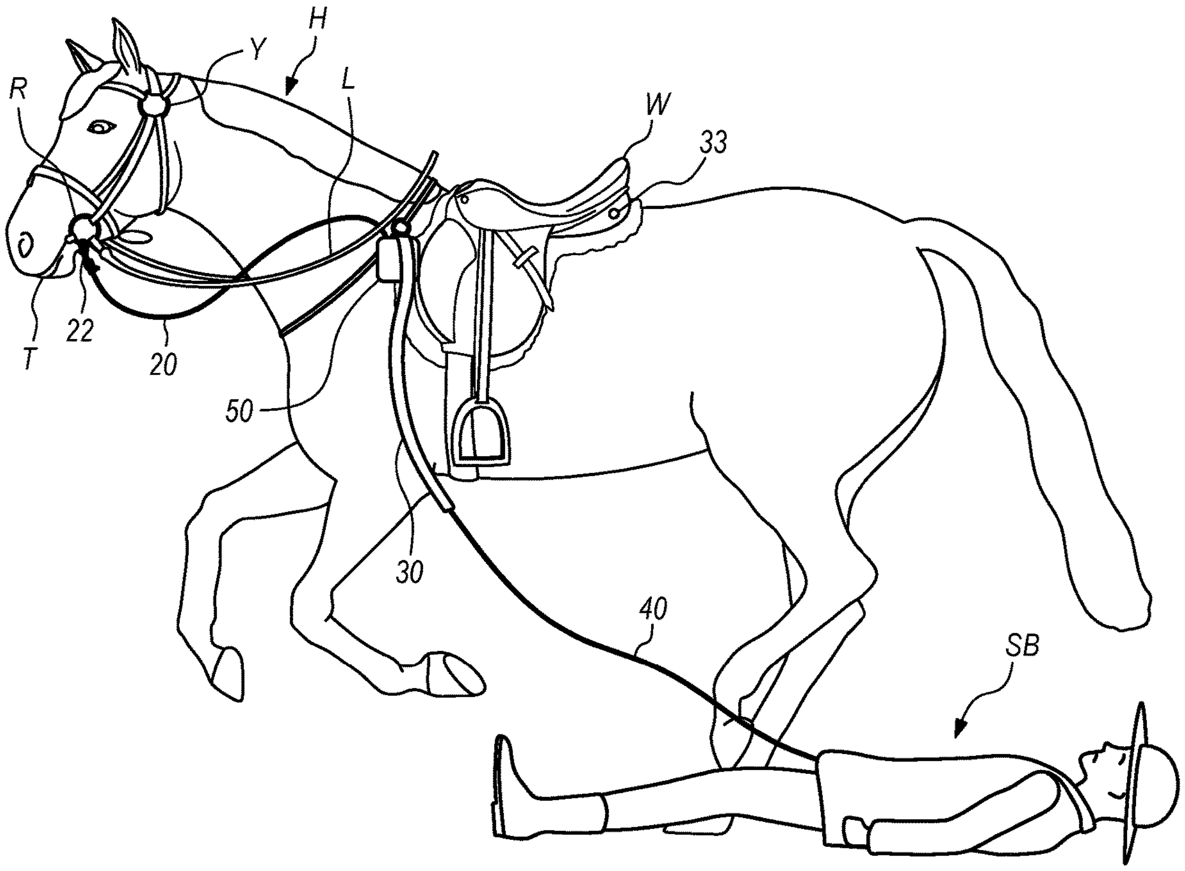
FIG. 6 illustrates an environmental view of the horse-stopping apparatus in use with the horse after the rider has fallen or been involuntarily dismounted or otherwise involuntarily separated from the horse.

FIG. 6 illustrates the situation when the rider SB is thrown or otherwise involuntarily dismounted from horse H. In this situation, trample segment 30 is pulled, also alternatively referred to as deployed or removed, from container 50 by the falling of the rider SB. As rider SB falls, she moves further away from horse H and trample segment 30 is removed from container 50 because trailing segment 40 is detachably fastened to trample segment 30. At some point after trample segment 30 is removed from container 50 by the movement of rider SB who is connected to trample segment 30 by trailing segment 40, cable ties 42 yield and the rider SB is no longer connected to trample segment 30. Phrased differently, after rider SB falls and horse H runs away, trample section 30 is pulled out of container 50 and trailing segment 40 separates from trample segment 30 at the point of connection with the trample segment 30 or the trailing segment 40 separates from the snap 44 attached to the rider. Alternatively, trailing segment 40 might separate at a different point along its length.

Figure 7:
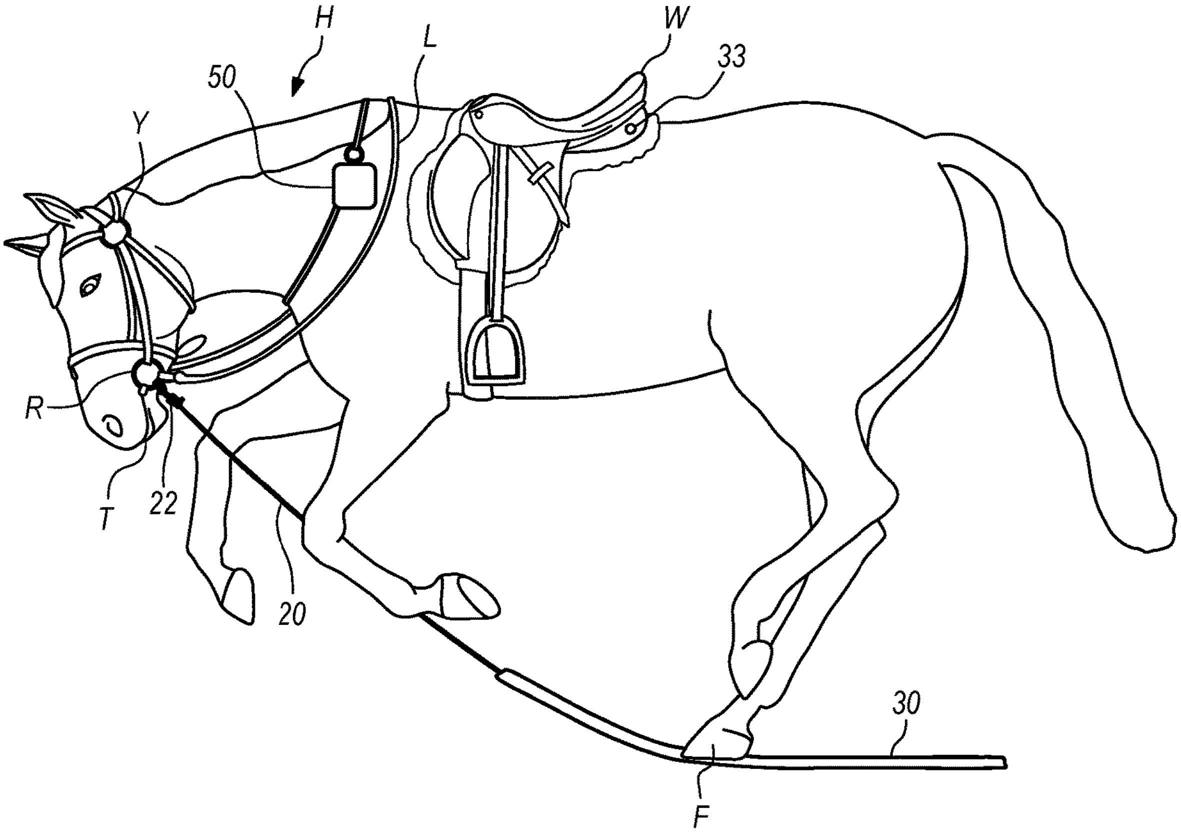
FIG. 7 illustrates an environmental view of the horse-stopping apparatus in use with the horse after the rider has fallen or been involuntarily dismounted or otherwise involuntarily parted from the horse and the trample section is being trampled upon by the horse and the trailing section has separated from the rider.

FIG. 7 further illustrates that trailing segment's cable ties 42 break and trailing segment 40 remains connected to rider SB. Preferably, trailing segment 40 will break closer to the rider SB. However, trample segment 30 remains connected to leading segment 20 and unspools (also referred to as unwraps or uncoils) from container 50. As illustrated in FIG. 7, trample segment 30 naturally unspools and, due to the forward motion of horse H, and is thereby positioned underneath horse H. As such, horse H's hooves F naturally step on trample segment 30.

As also illustrated in FIG. 7, and as discussed above, trample segment 30 is connected to leading segment 20. Leading segment 20 is connected to rings R of bit T and when hooves F step on trample segment 30, horse H's head is pulled downwardly. This downward pressure on horse H's head naturally slows and stops horse H. While this likely does not stop horse H instantaneously, horse H will naturally significantly slow and likely completely stop within a short distance without injuring itself. In addition, in this situation, rider SB is separated from trample segment 30. However, in the situation where horse H is stopped by horse-stopping apparatus 10, rider SB will be able to remount horse H and will therefore not be stranded.

FIG. 3B illustrates an alternative embodiment of horse stopping apparatus 10's trample segment 30 further comprising a locator 33. Various embodiments of locator 33 allow rider SB to track horse H. Alternatively, locator 33 could be fastened to horse H or to leading segment 20 or trample segment 30. In the situation where locator 33 is a crotal bell, or similar percussive noise maker, it has been found that it is preferable to loosely fasten locator 33 to trample segment 30 and to the container 50 or carabiner 56 by nylon rope similar to the material used to make leading segment 20. When trample segment 30 is contained within container 50, it will not jingle or ring until trample segment 30 is deployed from container 50. To be clear, after trample segment 30 deploys from container 50, crotal bell 33 is outside container 50 and is able to ring and identify the location of horse H. The movement of horse H causes locator 33 to jingle. Thereby allowing rider SB, or another person searching for horse H, to pinpoint the location of the jingle sound of locator 33. Alternatively, locator 33 could be a Global Positioning System (GPS) device. In this alternative, locator 33 could be attached to horse H, or any part of horse-stopping apparatus 10 that remained connected to horse H, i.e., leading segment 20 or trample segment 30.

While the invention has been illustrated and described in detail in the drawings and description, the same is to be considered as an illustration and is not limited to the exact embodiments shown and described. All equivalents, changes and modifications that come within the spirit of the invention are also protected by the claims that are set forth below.

What I claim is:

1. A method of mitigating the risk of a horse fleeing and becoming lost, comprising:

fastening a horse-stopping apparatus to a horse, wherein the horse is wearing a head piece, and wherein the horse stopping apparatus is for slowing and stopping the horse after a rider has been involuntarily separated, the horse stopping apparatus comprises:

a leading segment configured to detachably fastened to the horse's head piece;

a trample segment fastened to the leading segment; and, a trailing segment detachably fastened to the trample segment and also configured to be connected to the rider;

whereby if the rider is involuntarily separated from the horse, the trailing segment will extend the trample segment and the forward motion of the horse will carry the trample segment under the hooves of the horse;

whereby the hooves of the horse will trample the trample segment thereby pulling the horse's head downwardly and thereby slowing and stopping the horse.

2. The method of mitigating the risk of a horse fleeing and becoming lost of claim 1, further comprising: a container for containing at least the trample segment therein.

3. The method of mitigating the risk of a horse fleeing and becoming lost of claim 2, wherein the container contains at least a portion of the leading segment, a portion of the trample segment, and at least a portion of the trailing segment.

4. The method of mitigating the risk of a horse fleeing and becoming lost of claim 1, further comprising: a first snap hook and wherein the leading segment is detachably fastened to the horse's head piece by the first snap hook.

5. The method of mitigating the risk of a horse fleeing and becoming lost of claim 1, further comprising: a second snap hook and wherein the trailing segment is detachably fastened to the rider by the second snap hook.

6. The method of mitigating the risk of a horse fleeing and becoming lost of claim 1, further comprising the trample segment is comprised of flat webbing.

7. The method of mitigating the risk of a horse fleeing and becoming lost of claim 4, wherein the leading segment is fastened to a bit positioned in the horse's mouth by the horse's head piece.

8. A method of mitigating the risk of a horse fleeing and becoming lost, comprising:

fastening a horse-stopping apparatus for slowing and stopping a horse after a rider has been involuntarily separated, the horse wearing a head piece and a saddle, wherein the horse-stopping apparatus for slowing and stopping a horse after the rider has been involuntarily separated comprises:

a leading segment configured to be detachably fastened to the horse's head piece;

a trample segment fastened to the leading segment; and, a trailing segment detachably connected to the trample segment by a connector, and the trailing segment also configured to be detachably connected to the rider, the connector having a lower yield strength than the trample segment or the trailing segment;

whereby if the rider is involuntarily separated from the horse, the trailing segment will extend the trample segment and the forward motion of the horse will carry the trample segment under the hooves of the horse;

whereby the hooves of the horse will trample the trample segment thereby pulling the horse's head downwardly and thereby slowing and stopping the horse.

9. The method of mitigating the risk of a horse fleeing and becoming lost of claim 8, further comprising: a container for containing at least a portion of the trample segment in a coiled arrangement.

10. The method of mitigating the risk of a horse fleeing and becoming lost of claim 9, wherein the container contains at least a portion of the leading segment, a portion of the trample segment, and at least a portion of the trailing segment.

11. The method of mitigating the risk of a horse fleeing and becoming lost of claim 10, further comprising: a first snap hook, wherein the leading segment is detachably fastened to the horse's head piece by the first snap hook.

12. The method of mitigating the risk of a horse fleeing and becoming lost of claim 11, further comprising: a second snap hook, wherein the trailing segment is detachably fastened to the rider by the second snap hook.

13. The method of mitigating the risk of a horse fleeing and becoming lost of claim 12, further comprising the trample segment comprises flat webbing.

14. The method of mitigating the risk of a horse fleeing and becoming lost of claim 13, wherein the leading segment is fastened to a bit positioned in the horse's mouth.

15. The method of mitigating the risk of a horse fleeing and becoming lost of claim 2, further comprising a locator.

16. The method of mitigating the risk of a horse fleeing and becoming lost of claim 15, wherein the locator is a percussive noise maker, whereby after the trample segment deploys from the container, the percussive noise maker will jingle and make noise, whereby the noise will be useful in guiding the rider to the horse if the two become separated.

17. The method of mitigating the risk of a horse fleeing and becoming lost of claim 16, wherein the percussive noise maker is a bell.

18. The method of mitigating the risk of a horse fleeing and becoming lost of claim 15, wherein the locator, is a geolocating device detachably fastened to the horse.

19. The method of mitigating the risk of a horse fleeing and becoming lost of claim 15, wherein the locator is a GPS.

20. The method of mitigating the risk of a horse fleeing and becoming lost of claim 2, further comprising a geolocating device, the geolocating device detachably fastened to the container, the leading segment, the trample segment or the horse's tack.

* * * * *